(12) United States Patent
Zhang et al.

(10) Patent No.: US 10,775,607 B2
(45) Date of Patent: Sep. 15, 2020

(54) BACKLIGHT MODULE, HOLOGRAPHIC DISPLAY DEVICE AND HOLOGRAPHIC DISPLAY METHOD THEREOF

(71) Applicant: BOE Technology Group Co., Ltd., Beijing (CN)

(72) Inventors: Yuxin Zhang, Beijing (CN); Bingchuan Shi, Beijing (CN); Xinyin Wu, Beijing (CN); Yong Qiao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 304 days.

(21) Appl. No.: 15/750,756

(22) PCT Filed: Jun. 30, 2017

(86) PCT No.: PCT/CN2017/091140
§ 371 (c)(1),
(2) Date: Feb. 6, 2018

(87) PCT Pub. No.: WO2018/099070
PCT Pub. Date: Jun. 7, 2018

(65) Prior Publication Data
US 2020/0088991 A1    Mar. 19, 2020

(30) Foreign Application Priority Data
Dec. 2, 2016   (CN) .......................... 2016 1 1094802

(51) Int. Cl.
*G09F 13/04*    (2006.01)
*G02B 26/08*    (2006.01)
(Continued)

(52) U.S. Cl.
CPC ..... *G02B 26/0816* (2013.01); *G02B 27/0093* (2013.01); *G02B 30/26* (2020.01);
(Continued)

(58) Field of Classification Search
CPC ............... G02B 26/0816; G02B 30/26; G02B 27/0093; G03H 1/0005; G03H 1/2205;
(Continued)

(56) References Cited

U.S. PATENT DOCUMENTS

2009/0303417 A1    12/2009  Mizushima et al.
2016/0091648 A1*   3/2016   Bang ..................... G02B 6/005
                                                              362/607
2016/0147003 A1*   5/2016   Morozov ............ G03H 1/2286
                                                              359/11

FOREIGN PATENT DOCUMENTS

CN      102011986 A     4/2011
CN      102242889 A     11/2011
(Continued)

OTHER PUBLICATIONS

Oct. 9, 2017—(WO) International Search Report and Written Opinion Appn PCT/CN2017/091140 with English Translation.

*Primary Examiner* — Ali Alavi
(74) *Attorney, Agent, or Firm* — Banner & Witcoff, Ltd.

(57) ABSTRACT

A backlight module, a holographic display device and a holographic display method thereof are provided. The backlight module includes a semi-transparent layer and a reflective layer which are disposed opposite to each other, a light source, and a deflectable optical device. The light source is configured to emit a light beam, the deflectable optical device is configured to deflect a propagation direction of the light beam emitted from the light source and make the reflected light beam enter between the semi-transparent layer and the reflective layer in an angle, and is deflectable to change the angle.

17 Claims, 7 Drawing Sheets

(51) Int. Cl.
*G02B 30/26* (2020.01)
*G02B 27/00* (2006.01)
*G02F 1/13357* (2006.01)
*G03H 1/00* (2006.01)
*G03H 1/22* (2006.01)

(52) U.S. Cl.
CPC ..... *G02F 1/133605* (2013.01); *G03H 1/0005* (2013.01); *G03H 1/2205* (2013.01); *G03H 1/2294* (2013.01); *G02F 2203/12* (2013.01); *G03H 2250/38* (2013.01)

(58) Field of Classification Search
CPC .............. G03H 1/2294; G03H 2253/38; G02F 1/133605; G02F 2203/12
USPC ....................................................... 362/97.1
See application file for complete search history.

(56) References Cited

FOREIGN PATENT DOCUMENTS

| | | |
|---|---|---|
| CN | 102955256 A | 3/2013 |
| CN | 105938271 A | 9/2016 |

\* cited by examiner

BACKLIGHT MODULE, HOLOGRAPHIC DISPLAY DEVICE AND HOLOGRAPHIC DISPLAY METHOD THEREOF

The application is a U.S. National Phase Entry of International Application No. PCT/CN2017/091140 filed on Jun. 30, 2017, designating the United States of America and claiming priority to Chinese Patent Application No. 201611094802.9 filed on Dec. 2, 2016. The present application claims priority to and the benefit of the above-identified applications and the above-identified applications are incorporated by reference herein in their entirety.

TECHNICAL FIELD

Embodiments of the present disclosure relate to a backlight module, a holographic display device, and a holographic display method thereof.

BACKGROUND

With the continuous development of display technology, three-dimensional display technology gradually becomes a hotspot of research. Relative to a traditional two-dimensional display technology, the three-dimensional display technology can present more real and more stereo images, so as to improve accuracy and efficiency of acquiring, handling, delivering information of people and man-machine interaction.

At present, the three-dimensional display technology can be mainly divided into three categories: volumetric three-dimensional display technology, auto-stereoscopic three-dimensional display technology, spatial three-dimensional display technology and holographic three-dimensional display technology. Holographic three-dimensional display technology utilizes a light interference principle to record specific light waves emitted by an object in a form of interference fringe, and then utilizes a light diffraction principle to reconstruct physical light waves in certain conditions, so as to present a three-dimensional holographic image.

SUMMARY

At least one embodiment of the present disclosure provides a backlight module, a holographic display device and a holographic display method thereof. The backlight module includes a semi-transparent layer and a reflective layer which are disposed opposite to each other, a light source, and a deflectable optical device. The light source is configured to emit a light beam; and the deflectable optical device is configured to reflect a light beam emitted from the light source and make the reflected light beam enter between the semi-transparent layer and the reflective layer in an angle and be deflectable to change the angle. The backlight module can provide a light and thin backlight module, which reflects and transmits the light beam emitted from the light source between the semi-transparent layer and the reflective layer for several times, so as to expand the light beam to illuminate a relatively large scope, without providing a plurality of optical components, so as to further reduce the volume of the backlight module. Besides, the backlight module can change light emitting direction of the backlight module by providing the deflectable optical device to change the direction of the light beam entering between the semi-transparent layer and the reflective layer, so as to increase an observation range of a holographic display device adopting the backlight module.

At least one embodiment of the present disclosure provides a backlight module, which includes a semi-transparent layer; a reflective layer, disposed opposite to and spaced from the semi-transparent layer; a light source, configured to emit a light beam; and a deflectable optical device, configured to deflect a propagation direction of the light beam emitted from the light source, make the light beam enter between the semi-transparent layer and the reflective layer in a direction and be deflectable to change the direction.

For example, in the backlight module provided by an embodiment of the present disclosure, the semi-transparent layer is configured to reflect a part of a light beam striking the semi-transparent layer and transmit the rest part of the light beam.

For example, in the backlight module provided by an embodiment of the present disclosure, the semi-transparent layer and the reflective layer are disposed parallel to each other, so that a part of the light beam entering between the semi-transparent layer and the reflective layer is reflected between the semi-transparent layer and the reflective layer for multiple times.

For example, in the backlight module provided by an embodiment of the present disclosure, the semi-transparent layer includes a first region and a second region disposed at the periphery of the first region, an orthographic projection of the reflective layer on the semi-transparent layer is totally overlapped with the first region, and the deflectable optical device is disposed at a position facing to the second region.

For example, in the backlight module provided by an embodiment of the present disclosure, an end portion of the reflective layer is provided with an opening, the opening is configured to allow a light beam deflected by the deflectable optical device to enter between the semi-transparent layer and the reflective layer.

For example, in the backlight module provided by an embodiment of the present disclosure, the deflectable optical device includes: a first sub deflectable optical device; and a second sub deflectable optical device, wherein the light source is configured to respectively emit a first light beam to the first sub deflectable optical device and a second light beam to the second sub deflectable optical device, the first sub deflectable optical device is configured to deflect a propagation direction of the first light beam, make the first light beam enter between the semi-transparent layer and the reflective layer in a first direction and be deflectable to change the first direction, the second sub deflectable optical device is configured to deflect a propagation direction of the second light beam, make the second light beam enter between the semi-transparent layer and the reflective layer in a second direction and be deflectable to change the second direction.

For example, in the backlight module provided by an embodiment of the present disclosure, the first deflectable optical device and the second deflectable optical device are respectively disposed at positions facing two opposite ends of the semi-transparent layer.

For example, in the backlight module provided by an embodiment of the present disclosure, the light source includes: a first sub light source, configured to emit the first light beam; and a second sub light source, configured to emit the second light beam.

For example, in the backlight module provided by an embodiment of the present disclosure, the backlight module further includes a collimating lens, disposed between the light source and the deflectable optical device and configured to collimate the light beam emitted by the light source.

For example, in the backlight module provided by an embodiment of the present disclosure, the light source is configured to emit coherent light.

For example, in the backlight module provided by an embodiment of the present disclosure, the light source is disposed at a side of the reflective layer away from the semi-transparent layer.

For example, in the backlight module provided by an embodiment of the present disclosure, the deflectable optical device includes: a spindle; and an optical device, sleeved on the spindle, wherein the optical device is configured to deflect along with the rotation of the spindle.

For example, in the backlight module provided by an embodiment of the present disclosure, the optical device includes a reflective mirror or a deflecting lens.

At least one embodiment of the present disclosure provides a holographic display device, which includes a backlight module; and a spatial light modulator, the backlight module includes any one of the abovementioned backlight modules, and the spatial light modulator is disposed at a side of the semi-transparent layer away from the reflective layer.

For example, in the holographic display device provided by an embodiment of the present disclosure, the spatial light modulator is a liquid crystal spatial light modulator.

For example, in the holographic display device provided by an embodiment of the present disclosure, the holographic display device further includes: a camera, configured to capture a human eye position of a user; and a controller, respectively communicably connected with the camera and the deflectable optical device and configured to control the deflectable optical device to deflect according to the human eye position.

For example, in the holographic display device provided by an embodiment of the present disclosure, the holographic display device further includes: a lens, disposed at a side of the spatial optical modulator away from the backlight module.

At least one embodiment of the present disclosure provides a holographic display method of a holographic display device, wherein the holographic display device includes a backlight module, a spatial optical modulator, a camera and a controller, the backlight module includes any one of the abovementioned backlight module, the spatial optical modulator is disposed at a side of the semi-transparent layer away from the reflective layer, the holographic display method includes: acquiring a human eye position of a current user by the camera; and controlling the deflectable optical device to deflect to adjust an observation range of the holographic display device according to the human eye position by the controller.

For example, in the holographic display method provided by an embodiment of the present disclosure, the deflectable optical device includes: a first deflectable optical device and a second deflectable optical device, the light source is configured to respectively emit a first light beam to the first deflectable optical device and a second light beam to the second sub deflectable optical device, the first sub deflectable optical device is configured to deflect a propagation direction of the first light beam, make the first light beam enter between the semi-transparent layer and the reflective layer in a first direction and be deflectable to change the first direction, the second sub deflectable optical device is configured to deflect a propagation direction of the second light beam, make the second light beam enter between the semi-transparent layer and the reflective layer in a second direction and be deflectable to change the second direction, the holographic display method includes: controlling the light source to emit the first light beam or the second light beam according to the human eye position by the controller; and controlling the first sub deflectable optical device or the second sub deflectable optical device according to the human eye position to adjust the observation range of the holographic display device by the controller.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first", "second", etc., which are used in the description and the claims of the present disclosure, are not intended to indicate any sequence, amount or importance, but distinguish various components. The terms "includes", "including", etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1A:
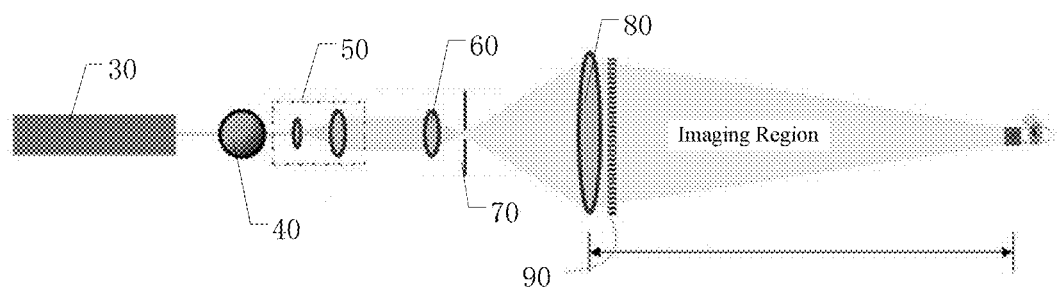
FIG. 1A is a schematic diagram of a holographic display device.

FIG. 1A is a schematic diagram of a holographic display device. As illustrated by FIG. 1A, a backlight module of the holographic display device generally includes a laser light source 30 serving as a light source, and the backlight module of the holographic display device further includes a brightness adjuster 40, a beam expander 50, an angle diffuser 60, a pinhole filter 70 and a lens 80, so as to perform beam expansion and collimation to the laser light source, so as to illuminate a spatial light modulator 90 located at a light emitting side of the backlight module to perform holographic display. However, the normal device for beam expansion and collimation includes a plurality of optical components, so as to constitute a huge optical system to perform beam expansion and collimation on the laser light source. Thus, the volume of this kind of backlight module is relatively big, which goes against the lighting and thinning of a holographic display device.

A conventional holographic display technology can form a relatively large wave front observation region, however, in the wave front observation region, except a region entering two windows of the pupils, the other regions cannot be observed, and belong to the wasted information. Based on this, the holographic display technology can largely reduce the data amount of calculation by only calculating the hologram information contributing to the window regions of the two eyes, i.e., only reconstructing the part of the wave front observation region which can be directly observed by the observer. However, the window technology result in a problem of a small observation viewing angle, the observer can only observe in a diffraction level observation window, and the observation range is limited.

Embodiments of the present disclosure provide a backlight module, a holographic display device and a holographic display method thereof. The backlight module includes a semi-transparent layer and a reflective layer which are disposed opposite to and spaced from each other, a light source and a deflectable optical device. The light source is configured to emit a light beam, the deflectable optical device is configured to deflect a propagation direction of the light beam emitted from the light source and make the light beam enter between the semi-transparent layer and the reflective layer in a direction, and the deflectable optical device is deflectable to change the direction. The backlight module can provide a light and thin backlight module, which reflects and transmits the light beam emitted from the light source between the semi-transparent layer and the reflective layer for multiple times, so as to expand the light beam to illuminate a relatively large scope, for example, an entire spatial light modulator disposed at a light emitting side of the backlight module, without providing a plurality of optical components, so as to further reduce the volume of the backlight module. Besides, the backlight module can change light emitting direction of the backlight module by providing the deflectable optical device to change the direction of the light beam entering between the semi-transparent layer and the reflective layer, so as to increase an observation range of a holographic display device adopting the backlight module.

Hereinafter, the backlight module, the holographic display device and the holographic display method provided by the embodiments of the present disclosure will be described with reference to the accompanying drawings.

Figure 1B:
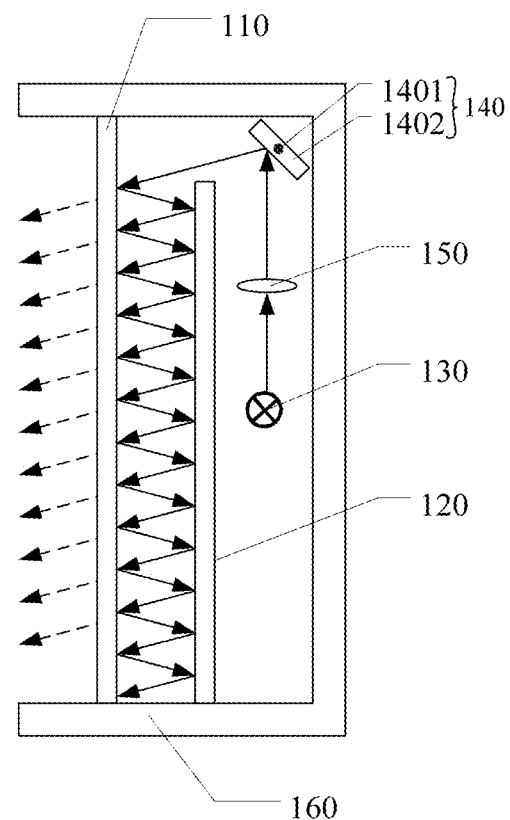
FIG. 1B is a structural schematic diagram of a backlight module provided by an embodiment of the present disclosure.

At least one embodiment of the present disclosure provides a backlight module. FIG. 1B is a structural schematic diagram of a backlight module. As illustrated by FIG. 1B, the backlight module includes a semi-transparent layer 110, a reflective layer 120, a light source 130 and a deflectable optical device 140. The semi-transparent layer 110 and the reflective layer 120 are disposed opposite to and spaced from each other; the light source 130 can emit a light beam; the deflectable optical device 140 is configured to deflect a propagation direction of the light beam emitted from the light source 130 and make the light beam enter between the semi-transparent layer 110 and the reflective layer 120 in an angle, besides, the deflectable optical device 140 is deflectable itself, so as to change the abovementioned angle. That is to say, the deflectable optical device 140 is disposed in the propagation direction of the light beam emitted from the light source 130, deflects the propagation direction of the light beam emitted from the light source 130, and make the light beam emitted from the light source 130 enter between the semi-transparent layer 110 and the reflective layer 120; besides, the deflectable optical device 140 can change a direction of the light beam entering between the semi-transparent layer 110 and the reflective layer 120 through its deflection. It is to be noted that, the abovementioned "deflect" refers to change the propagation direction of the light beam.

In the backlight module provided by the present embodiment, as illustrated by FIG. 1B, the deflectable optical device 140 can be used to make the light beam emitted from the light source 130 enter between the semi-transparent layer 110 and the reflective layer 120 along a direction, and the light beam entering between the semi-transparent layer 110 and the reflective layer 120 can be transmitted or reflected between the semi-transparent layer 110 and the reflective layer 120 for multiple times, the transmitted part is emitted from a side of the semi-transparent layer 110 away from the reflective layer 120. Besides, during a procedure of being continuously transmitted or reflected between the semi-transparent layer 110 and the reflective layer 120, the light beam emitted from the light source 130 can be expanded to form a relatively large area light source. Thus, the backlight module does not need to be provided with a plurality of optical components to perform beam expansion to the light beam emitted from the light source 130, and reduces the volume of the backlight module, so as to provide a light and thin backlight module. The backlight module can be applied to a two-dimensional display device or a holographic display device. Upon the backlight module being applied to a holographic display device, because the deflectable optical device 140 can change the direction of the light beam entering the semi-transparent layer 110 and the reflective layer 120 through its deflection, so as to change the light emitting direction of the backlight source, so as to increase an observation range of the holographic display device adopting the backlight module. It is to be noted that, in order to make the light beam successfully being reflected or transmitted between the semi-transparent layer 110 and the reflective layer 120 for multiple times, the propagation direction of the light beam entering the semi-transparent layer 110 and the reflective layer 120 cannot be perpendicular to the semi-transparent layer 110 and the reflective layer 120.

For example, as illustrated by FIG. 1B, the semi-transparent layer 110 and the reflective layer 120 are disposed opposite to each other and disposed at an interval with each other, the semi-transparent layer 110 and the reflective layer 120 can provided with medium therebetween or not, and the embodiments of the present disclosure are not limited thereto. Upon the semi-transparent layer and the reflective layer being provided with medium therebetween, the difference of the refractive indexes of the reflective layer and the medium layer can be utilized to realize total reflection, so as to realize reflecting the light beam striking the reflective layer, and the embodiments of the present disclosure are not limited thereto.

For example, the light source can emit coherent light, so as to make the backlight module applicable for the diffraction reconstruction of a holographic display device. Besides, the light source can emit parallel light or collimating light. Thus, the backlight module does not need to be provided with a collimating device to collimate the light beam emitted by the light source. Certainly, the embodiments of the present disclosure include but are not limited thereto, as illustrated by FIG. 1B, the backlight module can also include a collimating device 150 disposed between the light source 130 and the deflectable optical device 140, for example, a collimating lens, so as to collimate the light beam emitted by the light source 130.

For example, in the backlight module provided by an example of the present embodiment, as illustrated by FIG. 1B, the semi-transparent layer 110 can reflect a part of the light beam striking the semi-transparent layer 110 and transmit the rest part. Thus, the light beam reflected by the semi-transparent layer 110 can be reflected to the reflective layer 120, and then reflected back to the semi-transparent layer 110 through the reflection of the reflective layer 120; the light beam transmitted by the semi-transparent layer 110 can be emitted from a side of the semi-transparent layer 110 away from the reflective layer 120 and serves as emitting light of the backlight module. After multiple times of transmission, reflection, and transmission, the light beam entering between the semi-transparent layer 110 and the reflective layer 120 can finally be emitted from the semi-transparent layer 110 and form a relatively large area light source.

For example, in the backlight module provided by an example of the present embodiment, as illustrated by FIG. 1B, the semi-transparent layer 110 and the reflective layer 120 are disposed parallel to each other. Thus, a part of the light beam emitted between the semi-transparent layer 110 and the reflective layer 120 are reflected between the semi-transparent layer 110 and the reflective layer 120 for multiple times. Besides, as illustrated by FIG. 1B, the semi-transparent layer 110 and the reflective layer 120 are disposed parallel to each other, so that the light beam reflected by the reflective layer 120 can be emitted back to the semi-transparent layer 110 in the same direction, so as to guarantee that the light beam transmitted from the semi-transparent layer 110 for multiple times have the same direction. Thus, upon the light beam entering between the semi-transparent layer 110 and the reflective layer 120 is collimating light, the light emitted from the semi-transparent layer 110 or the backlight module is also collimating light.

Figure 2:
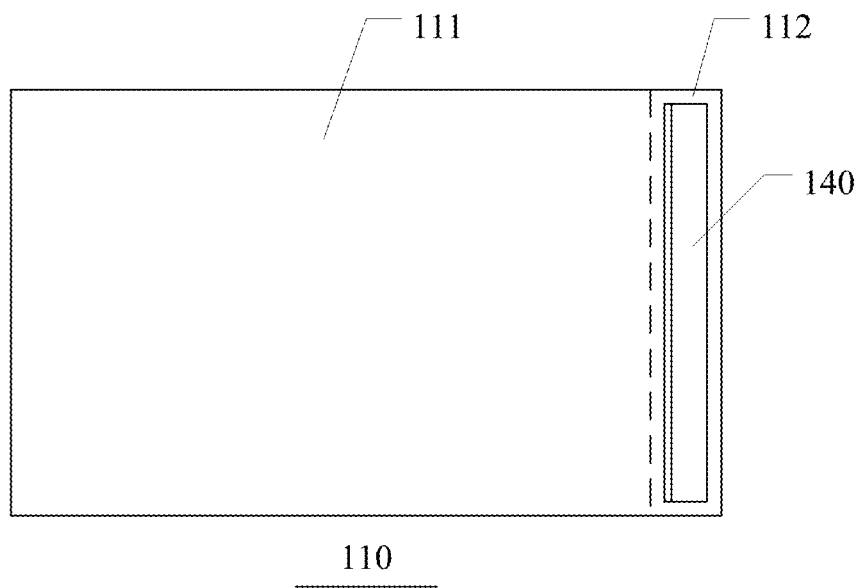
FIG. 2 is a position relationship diagram of a semi-transparent layer and a deflectable optical device provided by an embodiment of the present disclosure.

For example, in the backlight module provided by an example of the present embodiment, as illustrated by FIG. 2, the semi-transparent layer 110 includes a first region 111 and a second region 112 disposed at the periphery of the first region 111, an orthographic projection of the reflective layer 120 on the semi-transparent layer 110 is totally overlapped with the first region 111, and the deflectable optical device 140 can be disposed at a position facing the second region 112. Thus, because the second region 112 is not shielded by the reflective layer 120, the deflectable optical device 140 can make the light beam emitted by the light source enter between the reflective layer 120 and the semi-transparent layer 110 from the position facing the second region 112. It is to be noted that, in the present example, the deflectable optical device 140 can make the light beam emitted from the light source enter the first region 111 of the semi-transparent layer 110 or the second region of the semi-transparent layer 110, as long as the light beam entering between the reflective layer 120 and the semi-transparent layer 110 can be transmitted, reflected, and transmitted between the reflective layer 120 and the semi-transparent layer 110 for multiple times, and the embodiments of the present disclosure are not limited thereto.

Figure 3:
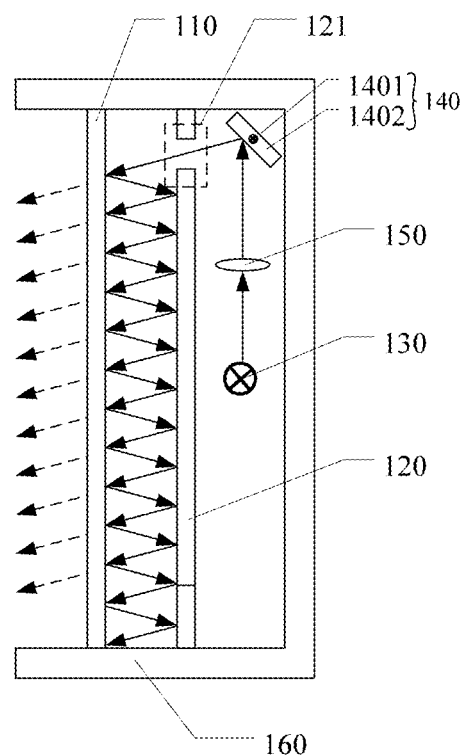
FIG. 3 is a structural schematic diagram of another backlight module provided by an embodiment of the present disclosure.

For example, in the backlight module provided by an example of the present embodiment, as illustrated by FIG. 3, an end portion of the reflective layer 120 may be provided with an opening 121, the opening 121 can be used to allow the light beam deflected by the deflectable optical device 140 to enter between the semi-transparent layer 110 and the reflective layer 120.

For example, in the backlight module provided by an example of the present embodiment, as illustrated by FIGS. 1B and 3, the light source 130 can be disposed at a side of the reflective layer 120 away from the semi-transparent layer 110.

For example, in the backlight module provided by an example of the present embodiment, as illustrated by FIG. 1B or 3, the deflectable optical device 140 includes a spindle 1401 and an optical device 1402 sleeved on the spindle 1401. The optical device 1402 can deflect with the rotation of the spindle 1401. For example, as illustrated by FIG. 1B or 3, the spindle 1401 can disposed parallel to an edge of the semi-transparent layer 110. Thus, the optical device 1402 can deflect with the spindle 1401 around an axis parallel to an edge of the semi-transparent layer 110.

For example, the optical device can be a reflective mirror. As illustrated by FIG. 3, the optical device 1402 is a planar reflective mirror. Certainly, the embodiments of the present disclosure include but are not limited thereto, and the optical device 1402 can be a curved reflective mirror or other reflective mirrors.

Figure 4:
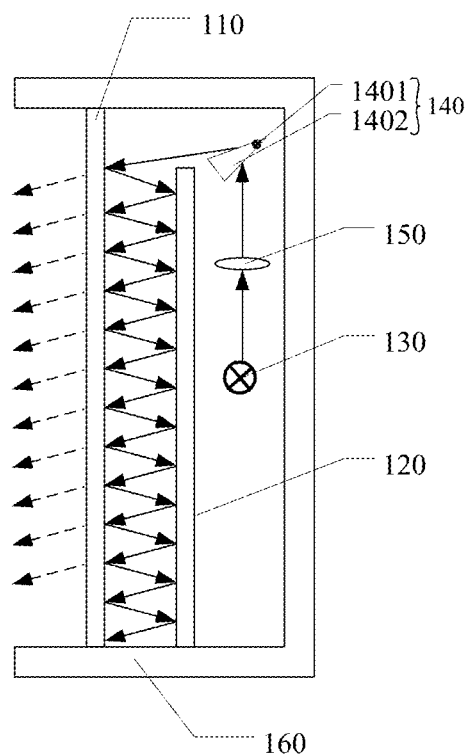
FIG. 4 is a structural schematic diagram of another backlight module provided by an embodiment of the present disclosure.

For example, the optical device can be a deflective lens. As illustrated by FIG. 4, the optical device 1402 is a triple prism.

For example, in the backlight module provided by an example of the present embodiment, as illustrated by FIGS. 1B, 3 and 4, the backlight module further includes a shell 160, the shell 160 includes an accommodate space, the semi-transparent layer 110, the reflective layer 120, the light source 130, the deflectable optical device 140 and the collimating device 150 can be disposed in the accommodate space.

Figure 5:
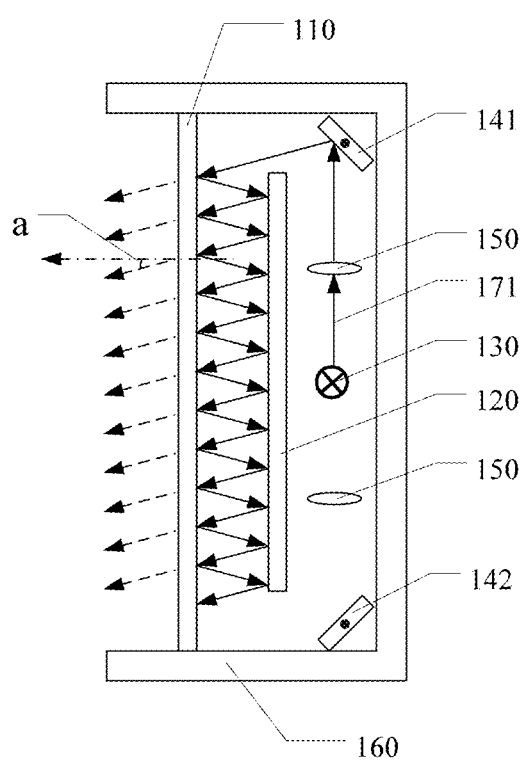
FIG. 5 is a structural schematic diagram of another backlight module provided by an embodiment of the present disclosure.
Figure 6:
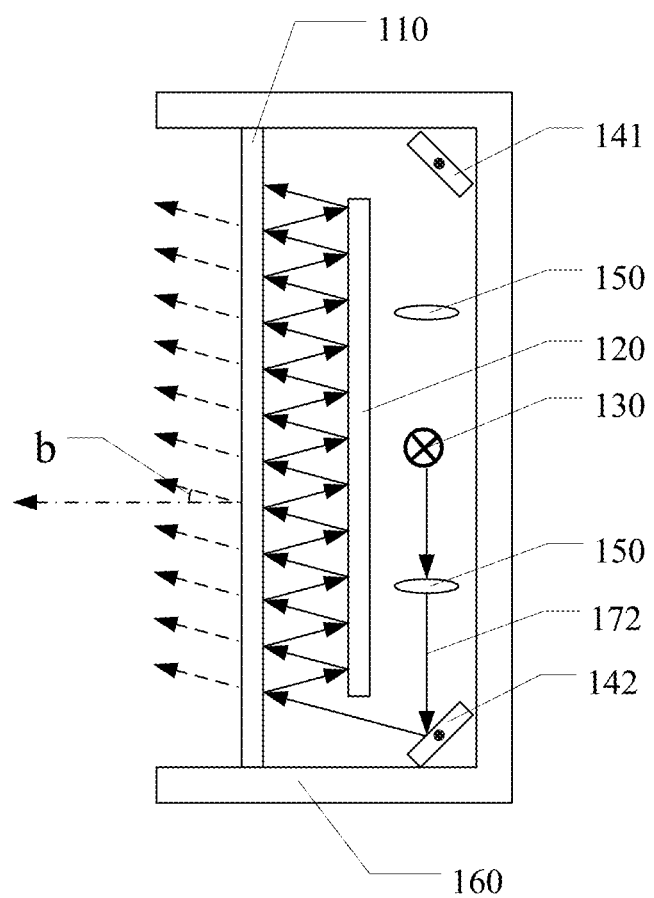
FIG. 6 is a structural schematic diagram of another backlight module provided by an embodiment of the present disclosure.

On the basis of the abovementioned embodiments, at least one embodiment of the present disclosure provides a backlight module. As illustrated by FIG. 5 and FIG. 6, in the backlight module, the deflectable optical device 140 includes a first sub deflectable optical device 141 and a second sub deflectable optical device 142. The light source 130 can respectively emit a first light beam 171 to the first sub deflectable optical device 141 and a second light beam 172 to the second sub deflectable optical device 142. As illustrated by FIG. 5, the first sub deflectable device 141 can deflect a propagation direction of the first light beam 171 and make the first light beam 171 enter between the semi-transparent layer 110 and the reflective layer 120 in a first direction, and is deflectable to change the first direction. As illustrated by FIG. 6, the second sub deflectable device 142 can deflect a propagation direction of the second light beam 172 and make the second light beam 172 enter between the semi-transparent layer 110 and the reflective layer 120 in a second direction, and is deflectable to change the second direction. Thus, more possibility of the light emitting direction of the backlight module can be provided by disposing the first sub deflectable optical device and the second sub deflectable optical device.

Figure 7:
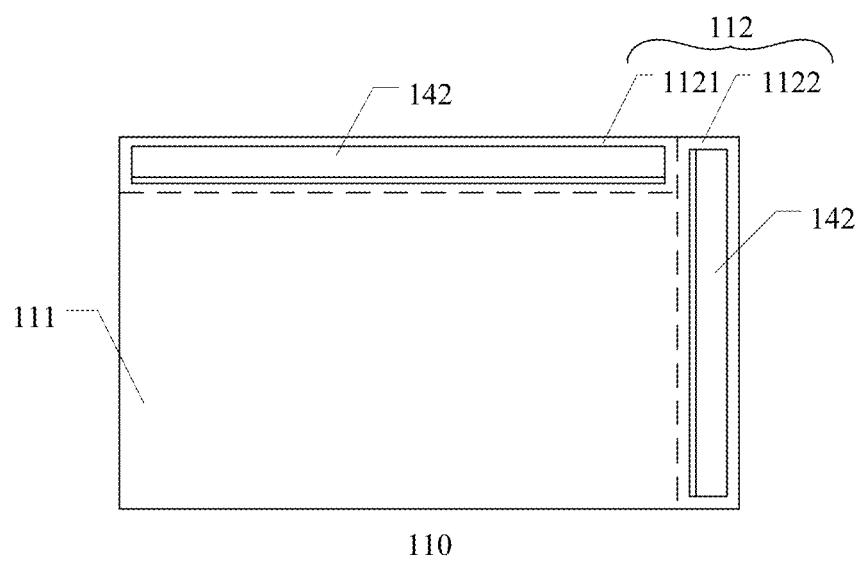
FIG. 7 is another position relationship diagram of a semi-transparent layer and a deflectable optical device provided by an embodiment of the present disclosure.

For example, as illustrated by FIG. 5 and FIG. 6, the first sub deflectable optical device 141 and the second sub deflectable optical device 142 can be respectively disposed at the positions facing two opposite end portions of the semi-transparent layer 110. As illustrated by FIG. 5, with respect to a direction perpendicular to the semi-transparent layer 110, an angle between the first direction and the direction perpendicular to the semi-transparent layer 110 is a, the first direction can be changed by deflecting the first sub deflectable optical device 141, so as to make the value of a vary from 0 to 90 degrees; that is to say, the first direction is the lower left direction in FIG. 5 and is variable. As illustrated by FIG. 6, with respect to the direction perpendicular to the semi-transparent layer 110, an angle between the second direction and the direction perpendicular to the semi-transparent layer 110 is b, and the second direction can be changed by deflecting the second sub deflectable optical device 142, so as to make the value of b vary from 0 to 90 degrees; that is to say, the second direction is the upper left direction in FIG. 6 and is variable. Thus, the light emitting direction of the backlight module can be changed from the lower left direction in FIG. 5 to the upper left direction in FIG. 6 or from the upper left direction in FIG. 6 to the lower left direction in FIG. 5 by disposing the first sub deflectable optical device and the second sub deflectable optical device. Certainly, the first sub deflectable optical device and the second deflectable optical device can also be not respectively disposed at the positions facing the two opposite end portions of the semi-transparent layer, and the embodiments of the present disclosure are not limited thereto. For example, FIG. 7 illustrates a planar schematic diagram of a position relationship between a semi-transparent layer and a deflectable optical device. As illustrated by FIG. 7, the semi-transparent layer 110 can include a first region 111 and a second region 112 disposed at the periphery of the first region 111, an orthographic projection of the reflective layer 120 on the semi-transparent layer 110 and the first region 111 are totally overlapped, the second region 112 can include an upper second region 1121 and a right second region 1122. The first sub deflectable optical device 141 can be disposed at a position facing the upper second region 1121, and the second deflectable optical device 142 can be disposed at a position facing the right second region 1122, so as to change the light emitting direction of the backlight module from a direction deflected leftward with respect to that perpendicular to the paper plane in FIG. 7 to a direction deflected downward with respect to that perpendicular to the paper plane in FIG. 7, or, from a direction deflected downward with respect to that perpendicular to the paper plane in FIG. 7 to a direction deflected leftward with respect to that perpendicular to the paper plane in FIG. 7, by disposing the first sub deflectable optical device 141 and the second sub deflectable optical device 142. It is to be noted that, the abovementioned first sub deflectable optical device and the second sub deflectable optical device can work together, so as to provide two light emitting directions for the backlight module.

Figure 8:
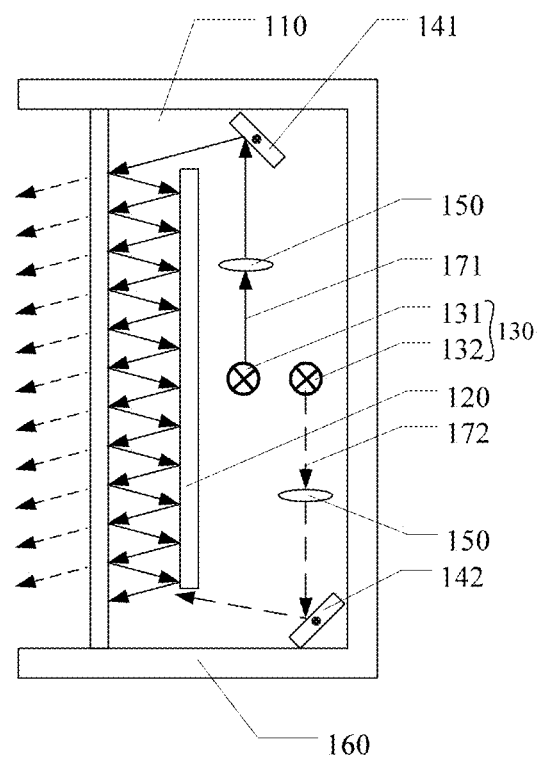
FIG. 8 is another position relationship diagram of a semi-transparent layer and a deflectable optical device provided by an embodiment of the present disclosure.

For example, in the backlight module provided by an example of the present embodiment, as illustrated by FIG. 8, the light source 130 can include a first sub light source 131 and a second sub light source 132, respectively used to emit a first light beam 171 and a second light beam 172. It is to be noted that, the first sub light source and the second sub light source include but are not limited to a specific light source, for example, the first sub light source and the second sub light source can respectively includes a plurality of light sources, for example, light sources respectively emitting red light, green light and blue light, and work in a time-division mode, so as to provide colorful emitting light for the backlight module.

Figure 9:
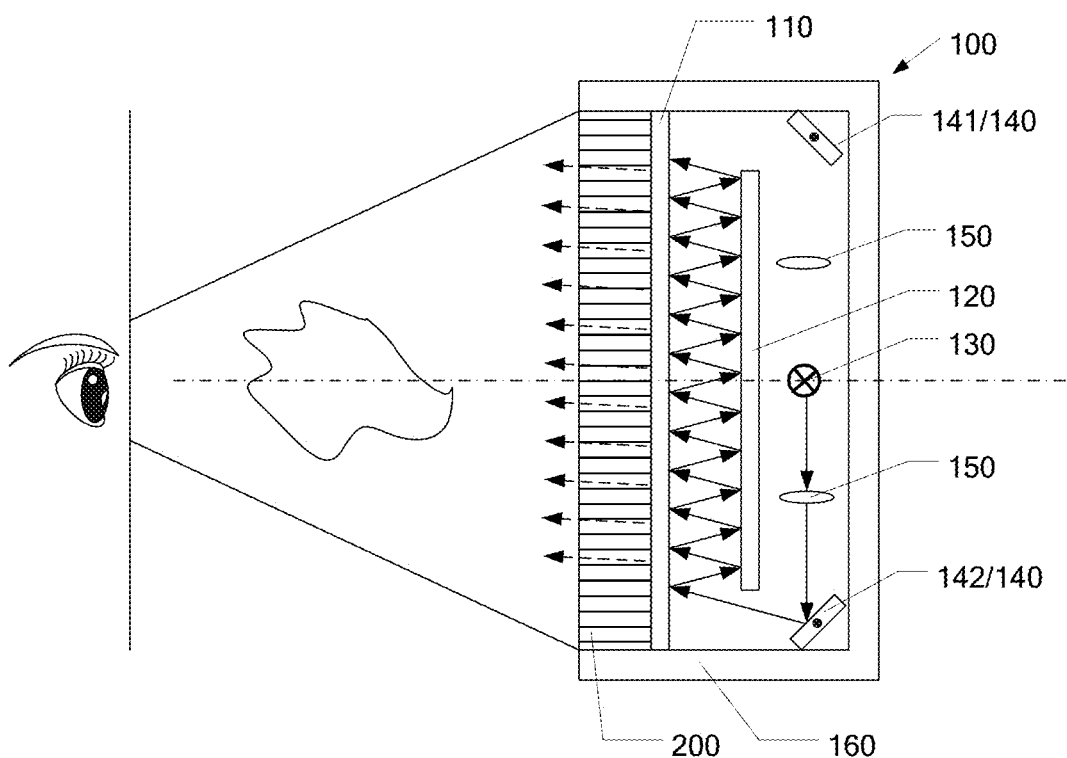
FIG. 9 is a structural schematic diagram of a holographic display device provided by an embodiment of the present disclosure.

At least one embodiment of the present disclosure provides a holographic display device. As illustrated by FIG. 9, the holographic display device includes a backlight module 100 and a spatial light modulator 200. The backlight module 100 can adopt the backlight module according to the above embodiments, and the space light modulator 200 is disposed at a side of the semi-transparent layer 100 away from the reflective layer 120.

In the holographic display device provided by the present embodiment, the light emitted by the backlight module 100 can be modulated by the spatial light modulator 200 and display a holographic image at a side of the spatial light modulator 200 away from the semi-transparent layer 110. Because the holographic display device adopts the backlight module according to the above embodiments. Thus, compared with the common holographic display device, the holographic display device provided by the present embodiment is lighter and thinner; besides, because the light emitting direction of the backlight module can be adjusted by deflecting the deflectable optical device, so as to adjust an observation range of the holographic device.

Figure 10:
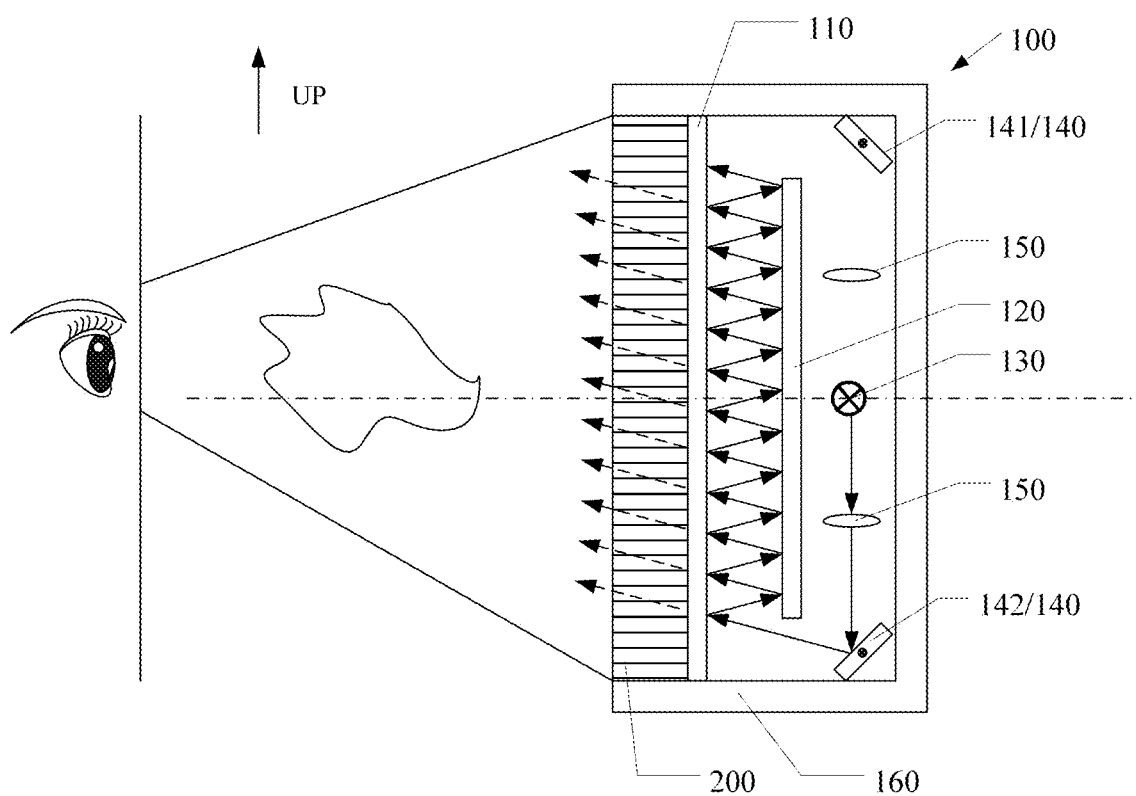
FIG. 10 is a structural schematic diagram of another holographic display device provided by an embodiment of the present disclosure.

For example, as illustrated by FIG. 9, because the observation range of holographic display device is relatively small, upon human eyes watching a holographic image produced by the holographic display device, if the position of the user changes, the human eyes may leave or deviate from the observation range of the holographic display device, as a result, the user cannot clearly see the holographic image produced by the holographic display device, so as to result in relatively bad user experience. However, the holographic display device provided by the present embodiment can adjust the light emitting direction of the backlight module through the deflectable optical device, so as to change the observation range of the holographic display device, so as to avoid the situation that the human eyes may leave or deviate from the observation range of the holographic display device due to the change of the position of user and guarantee the human eyes of the user to stay within the observation range of the holographic display device. For example, as illustrated by FIG. 10, upon the human eyes of user moving along an upward direction in FIG. 10, the deflectable optical device 140 can be adjusted, for example, the second sub deflectable optical device 142, to make the light emitting direction of the backlight module 100 deflect along an upward direction in FIG. 10, so as to make the observation range of the holographic display device move along an upward direction in FIG. 10 and make the human eyes of user stay within the observation range of the holographic display device. It is to be noted that, the upward direction in FIG. 10 can be an upward direction of the holographic display device relative to the ground, or a downward, leftward, rightward direction of the holographic display device relative to the ground, and the embodiments of the present disclosure are not limited thereto.

Figure 11:
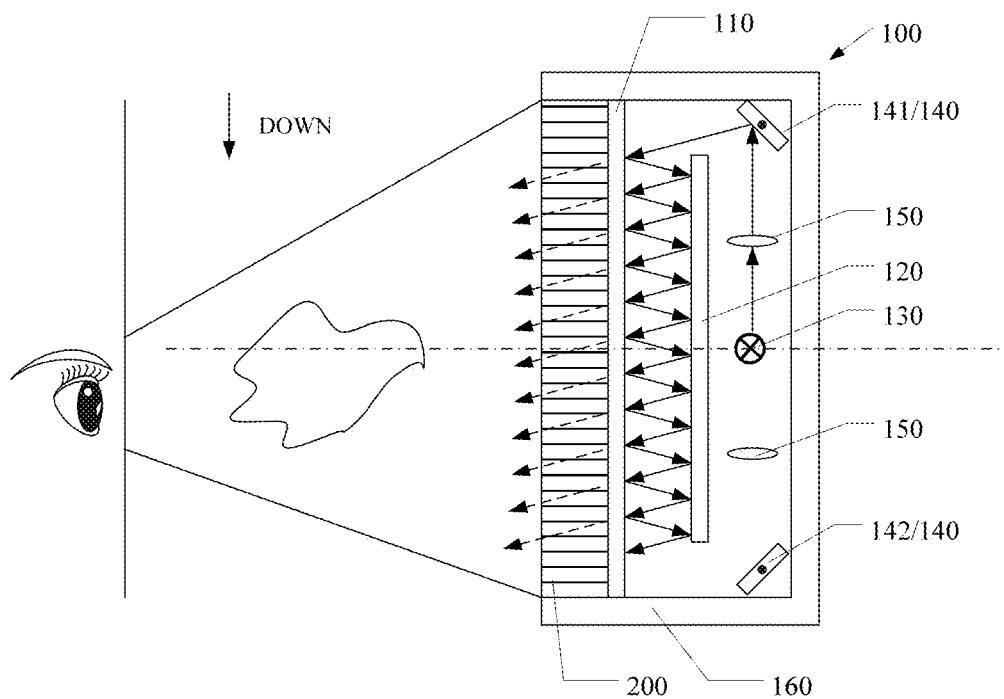
FIG. 11 is a structural schematic diagram of another holographic display device provided by an embodiment of the present disclosure.

For example, as illustrated by FIG. 11, the deflectable optical device 140 includes a first sub deflectable optical device 141 and a second sub deflectable 142. Upon the human eyes of user moving along a downward direction in FIG. 11, the first sub deflectable optical device 141 can be adjusted to make the light emitting direction of the backlight module 100 deflect along a downward direction in FIG. 11, so as to make the observation range of the holographic display device move along a downward direction in FIG. 11 and make the human eyes of user stay within the observation range of the holographic display device. It is to be noted that, the downward direction in FIG. 11 is opposite to the upward direction in FIG. 10, at this time, the first sub deflectable optical device and the second sub deflectable optical device can be respectively disposed at the positions facing two opposite end portions of the semi-transparent layer; certainly, the abovementioned downward direction in FIG. 11 can be perpendicular to or intersect with the upward direction in FIG. 10, so as to provide more adjusting directions of the observation range of the holographic display device, and the embodiments of the present disclosure are not limited thereto.

Figure 12:
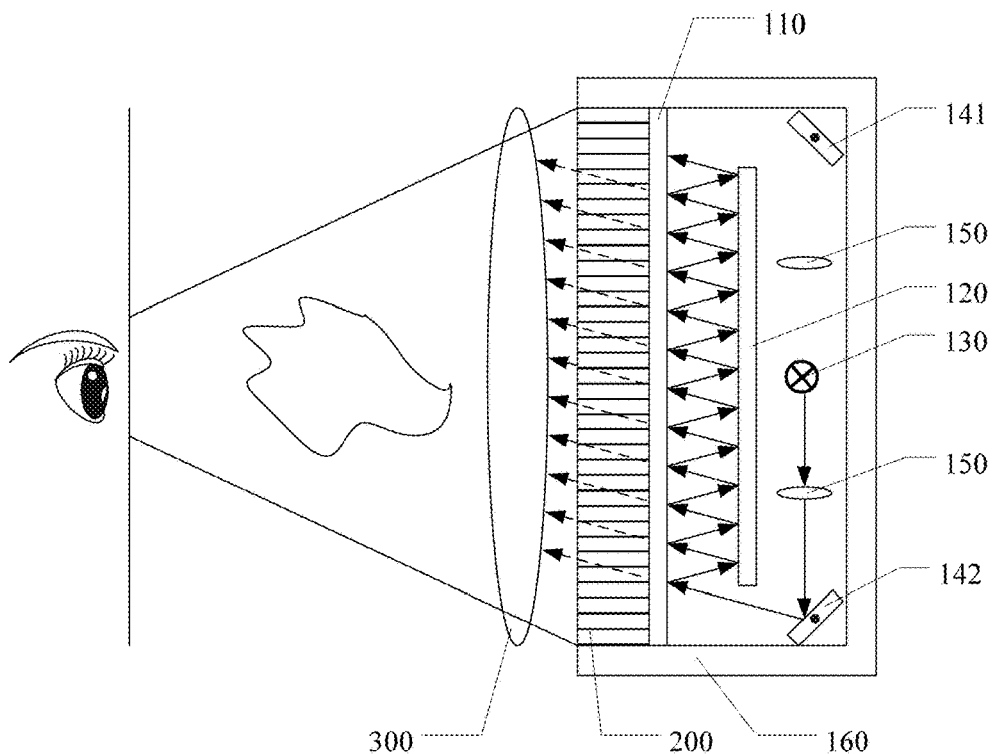
FIG. 12 is a structural schematic diagram of another holographic display device provided by an embodiment of the present disclosure.

For example, in the holographic display device provided by an example of the present embodiment, as illustrated by FIG. 12, the holographic display device further includes a lens disposed at a side of the spatial light modulator 200 away from the backlight module 100, so as to focus the emitting light of the holographic display device, so as to improve the quality of the holographic image.

Figure 13:
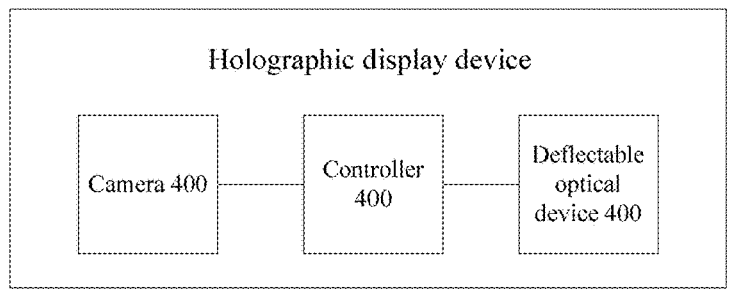
FIG. 13 is a schematic diagram of a holographic display device provided by an embodiment of the present disclosure.

For example, in the holographic display device provided by an example of the present embodiment, as illustrated by FIG. 13, the holographic display device further includes a camera 400 and a controller 500. The camera 400 and the controller 500 are communicably connected, the controller 500 is connected with the deflectable optical device 400, the camera 400 can acquire or capture human eye position of user, the controller 500 can control the deflectable optical device 140 to deflect according to the human eye position acquired by the camera 400, so as to guarantee that the human eyes always stay within the observation range of the holographic display device upon the user moving, and the specific adjusting method can refer to the abovementioned relevant description.

For example, the spatial light modulator can adopt a liquid crystal spatial light modulator.

Figure 14:
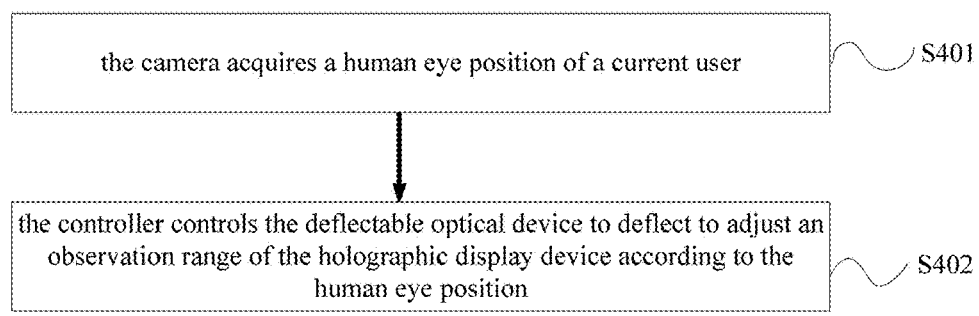
FIG. 14 is a flow diagram of a holographic display method provided by an embodiment of the present disclosure.

At least one embodiment of the present disclosure provides a holographic display method of a holographic display device. The holographic display device includes a backlight module, a spatial light modulator, a camera and a controller, the backlight module can be the backlight module according to the above embodiments, the spatial light modulator is disposed at a side of the semitransparent layer away from the reflective layer, as illustrated by FIG. 14, the holographic display method includes the following steps S401-S402.

Step S401: the camera acquires a human eye position of a current user.

Step S402: the controller controls the deflectable optical device to deflect according to the human eye position to adjust an observation range of the holographic display device.

Thus, upon the user moving, it can be guaranteed that the human eyes always stay within the observation range of the holographic display device, and the specific adjusting method can refer to the abovementioned relevant description.

For example, in the holographic display method provided by an example of the present embodiment, the deflectable device includes: a first deflectable optical device and a second deflectable optical device, the light source is configured to respectively emit a first light beam to the first deflectable optical device and a second light beam to the second sub deflectable optical device, the first sub deflectable optical device is configured to deflect a propagation direction of the first light beam, make the first light beam enter between the semi-transparent layer and the reflective layer in a first direction and be deflectable to change the first direction, the second sub deflectable optical device is configured to deflect a propagation direction of the second light beam, make the second light beam enter between the semi-transparent layer and the reflective layer in a second direction and be deflectable to change the second direction, the holographic display method includes: the controller controls the light source to emit the first light beam or the second light beam according to the human eye position; that is to say, the controller can select to use the light source to emit the first light beam or the second light beam according to human eye position; and the controller controls the first sub deflectable optical device or the second sub deflectable optical device according to the human eye position to adjust an observation range of the holographic display device. For example, referring to FIG. 10 and FIG. 11, upon the human eyes of user moving along an upward direction in FIG. 10, the second sub deflectable optical device 142 can be selected to make the light emitting direction of the backlight module 100 deflect along an upward direction in FIG. 10, and the light source is controlled to emit the second light beam, so as to make the observation range of the holographic display device move along an upward direction in FIG. 10 and make the human eyes of user stay within the observation range of the holographic display device. Upon the human eyes of user moving along a downward direction in FIG. 11, the first sub deflectable optical device 141 can be selected to make the light emitting direction of the backlight module 100 deflect along a downward direction in FIG. 11, and the light source is controlled to emit the second light beam instead of the first light beam, so as to make the direction of the light exiting from the backlight module 100 deflect toward the downward direction in FIG. 11, make the observation range of the holographic display device move along the downward direction in FIG. 11, and make the human eyes of user stay within the observation range of the holographic display device. It is to be noted that, the upward direction in FIG. 10 can be an upward direction of the holographic display device with respect to the ground, and can also be a downward direction, a rightward direction, or a leftward direction of the holographic display device with respect to the ground, and the embodiments is not limited thereto. The downward direction in FIG. 11 is opposite to the upward direction in FIG. 10, at this time, the first sub deflectable optical device and the second sub deflectable optical device can be respectively disposed at the positions facing two opposite end portions of the semi-transparent layer; certainly, the abovementioned downward direction in FIG. 11 can be perpendicular to or intersect with the upward direction in FIG. 10, so as to provide more adjusting directions of the observation range of the holographic display device, and the embodiments of the present disclosure are not limited thereto.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

The foregoing is only the preferred embodiments of the present invention and not intended to limit the scope of protection of the present invention. Any variations or replacements which can be easily thought of by those skilled in the art in the scope of the present disclosure all shall fall within the scope of protection of the present disclosure. The scope of protection of the present invention should be defined by the appended claims.

What is claimed is:

1. A backlight module, comprising:
   a semi-transparent layer;
   a reflective layer, disposed opposite to and spaced from the semi-transparent layer;
   a light source, configured to emit a light beam; and
   a deflectable optical device, configured to deflect a propagation direction of the light beam emitted from the light source, make the light beam enter between the semi-transparent layer and the reflective layer in a direction and be deflectable to change the direction,
   wherein the semi-transparent layer comprises a first region and a second region disposed at a periphery of the first region, an orthographic projection of the reflective layer on the semi-transparent layer is totally overlapped with the first region, and the deflectable optical device is disposed at a position facing the second region,
   wherein the second region comprises a first sub-region and a second sub-region which are adjacent and connected to each other, the deflectable optical device comprises a first sub deflectable optical device disposed at a position facing the first sub-region, and a second sub deflectable optical device disposed at a position facing the second sub-region.

2. The backlight module according to claim 1, wherein the semi-transparent layer is configured to reflect a part of a light beam striking the semi-transparent layer and transmit the remaining part of the light beam.

3. The backlight module according to claim 1, wherein the semi-transparent layer and the reflective layer are disposed parallel to each other, so that a part of the light beam entering between the semi-transparent layer and the reflective layer is reflected between the semi-transparent layer and the reflective layer for multiple times.

4. The backlight module according to claim 1, wherein the deflectable optical device comprises a reflective mirror or a deflecting lens.

5. The backlight module according to claim 1, wherein an end portion of the reflective layer is provided with an opening, the opening is configured to allow the light beam deflected by the deflectable optical device to enter between the semi-transparent layer and the reflective layer.

6. The backlight module according to claim 1,
   wherein the light source is configured to respectively emit a first light beam to the first sub deflectable optical device and a second light beam to the second sub deflectable optical device, the first sub deflectable optical device is configured to deflect a propagation direction of the first light beam, make the first light beam enter between the semi-transparent layer and the reflective layer in a first direction and be deflectable to change the first direction, the second sub deflectable optical device is configured to deflect a propagation direction of the second light beam, make the second light beam enter between the semi-transparent layer and the reflective layer in a second direction and be deflectable to change the second direction.

7. The backlight module according to claim 6, wherein the light source comprises:
   a first sub light source, configured to emit the first light beam; and
   a second sub light source, configured to emit the second light beam,
   wherein the first light beam and the second light beam point in opposite directions and are not collinear.

8. The backlight module according to claim 1, wherein the deflectable optical device comprises:
   a spindle; and
   an optical device, sleeved on the spindle,
   wherein the optical device is configured to deflect along with a rotation of the spindle.

9. The backlight module according to claim 1, further comprising:
   a collimating lens, disposed between the light source and the deflectable optical device and configured to collimate the light beam emitted by the light source.

10. The backlight module according to claim 1, wherein the light source is configured to emit coherent light.

11. The backlight module according to claim 1, wherein the light source is disposed at a side of the reflective layer away from the semi-transparent layer.

12. A holographic display method of a holographic display device, wherein the holographic display device comprises a backlight module, a spatial optical modulator, a camera, and a controller, the backlight module comprises the backlight module according to claim 1, the spatial optical modulator is disposed at a side of the semi-transparent layer away from the reflective layer, the holographic display method comprises:
   acquiring, by the camera, a human eye position of a current user; and
   controlling, by the controller, the deflectable optical device to deflect to adjust an observation range of the holographic display device according to the human eye position.

13. The holographic display method according to claim 12, wherein the light source is configured to respectively emit a first light beam to the first sub deflectable optical device and a second light beam to the second sub deflectable optical device, the first sub deflectable optical device is configured to deflect a propagation direction of the first light beam, make the first light beam enter between the semi-transparent layer and the reflective layer in a first direction and be deflectable to change the first direction, the second sub deflectable optical device is configured to deflect a propagation direction of the second light beam, make the second light beam enter between the semi-transparent layer and the reflective layer in a second direction and be deflectable to change the second direction, the holographic display method comprises:
 controlling, by the controller, the light source to emit the first light beam or the second light beam according to the human eye position; and
 controlling, by the controller, the first sub deflectable optical device or the second sub deflectable optical device according to the human eye position to adjust the observation range of the holographic display device.

14. A holographic display device, comprising:
 a backlight module; and
 a spatial light modulator,
 wherein the backlight module comprises the backlight module according to claim 1, the spatial light modulator is disposed at a side of the semi-transparent layer away from the reflective layer.

15. The holographic display device according to claim 14, wherein the spatial light modulator is a liquid crystal spatial light modulator.

16. The holographic display device according to claim 14, further comprising:
 a camera, configured to capture a human eye position of a user; and
 a controller, communicably connected with the camera and the deflectable optical device and configured to control the deflectable optical device to deflect according to the human eye position.

17. The holographic display device according to claim 14, further comprising:
 a lens, disposed at a side of the spatial light modulator away from the backlight module.

* * * * *